(12) United States Patent
Martin

(10) Patent No.: US 6,906,637 B2
(45) Date of Patent: Jun. 14, 2005

(54) UTILITY DISCONNECT CONTROLLER

(75) Inventor: Warren T. Martin, Lafayette, IN (US)

(73) Assignee: Landis + Gyr, Inc., Lafayette, IN (US)

( * ) Notice: Subject to any disclaimer, the term of this patent is extended or adjusted under 35 U.S.C. 154(b) by 0 days.

(21) Appl. No.: 10/282,834

(22) Filed: Oct. 29, 2002

(65) Prior Publication Data

US 2003/0080876 A1 May 1, 2003

Related U.S. Application Data

(60) Provisional application No. 60/351,104, filed on Oct. 29, 2001.

(51) Int. Cl.[7] .............................................. G08B 23/00
(52) U.S. Cl. ............................. 340/870.02; 340/310.01
(58) Field of Search ....................... 340/870.02, 310.01, 340/870.12, 870.13; 702/60

(56) References Cited

U.S. PATENT DOCUMENTS

| | | |
|---|---|---|
| 4,749,992 A | 6/1988 | Fitzemeyer et al. |
| 4,964,058 A | 10/1990 | Brown, Jr. |
| 5,198,809 A | 3/1993 | Day |
| 5,434,973 A | 7/1995 | Lu |
| 5,664,202 A | 9/1997 | Chen et al. |
| 5,757,643 A | 5/1998 | Kuroda et al. |
| 5,777,895 A | 7/1998 | Kuroda et al. |
| 5,805,458 A * | 9/1998 | McNamara et al. .......... 702/60 |
| 5,818,725 A | 10/1998 | McNamara et al. |
| 5,880,677 A | 3/1999 | Lestician |
| 5,952,739 A | 9/1999 | Grass et al. |
| 5,959,549 A | 9/1999 | Synesiou et al. |
| 6,043,642 A * | 3/2000 | Martin et al. ................ 324/142 |
| 6,061,668 A | 5/2000 | Sharrow |
| 6,122,603 A | 9/2000 | Budike, Jr. |
| 6,167,042 A * | 12/2000 | Garland et al. ............. 370/354 |

* cited by examiner

*Primary Examiner*—Anh V. La
(74) *Attorney, Agent, or Firm*—Maginot, Moore & Beck LLP

(57) ABSTRACT

An apparatus for controlling the connection of a customer to a plurality of utilities includes a utility meter housing, a measurement device, and a control circuit. The measurement device is supported by the housing and is operable to measure a consumed commodity. The control circuit is also supported by the housing and is configured to provide control signals to a plurality of connection devices. Each of the plurality of connection devices is operable to selectively connect and disconnect the customer to one of the plurality of utilities responsive to the control signals.

21 Claims, 3 Drawing Sheets

UTILITY DISCONNECT CONTROLLER

This application claims the benefit of U.S. Provisional Patent Application Ser. No. 60/351,104, filed Oct. 29, 2001, which is incorporated herein by reference.

FIELD OF THE INVENTION

The present invention relates generally to control devices, and in particular, control devices that control the access to one or more utility commodities or services.

BACKGROUND OF THE INVENTION

Utility commodities, for example, gas, electricity, telephone, cable television, and water, are typically made available for use by customers in advance of payment. In other words, the customer uses the utility commodity and then receives a bill for the consumed commodity.

Problems with such an arrangement arise when a customer's invoices are in arrears. In such cases, it is sometimes necessary to inhibit access to the consumed commodity pending payment of past-due invoices. However, terminating or inhibiting access presents other problems.

For example, in some situations, governmental regulations dictate the conditions under which access to certain commodities may be terminated or inhibited. Moreover, the physical act of disconnecting service, particularly for gas, electricity or water, typically requires access to the customer supply line or the customer's utility meter. This requirement of access requires a significant amount of labor, and further can result in a an unpleasant and possibly dangerous interaction with the customer.

One prior art arrangement avoids some of such drawbacks by providing remote control over connection to the electrical utility is shown in U.S. Pat. No. 5,959,549 to Synesiou et al ("Synesiou"). The arrangement shown in Synesiou employs a communal control device that communicates with a remote measurement module. The remote measurement module both performs electrical energy consumption measurements and controllably connects and disconnects the customer's electrical system from the utility electrical mains. While the arrangement of Synesiou addresses some of the problems of the prior art, it includes a number of drawbacks. Specifically, the Synesiou arrangement only allows for remote disconnection and connection the electrical utility. No method or apparatus is provided that would allow for remote connection or disconnection of multiple utilities.

Accordingly, there is a need for a control device that assists in controlling access to utility commodities that addresses one or more of the above drawbacks.

SUMMARY OF THE INVENTION

The present invention addresses the above described need, as well as others, by providing a device that allows for controllably connecting and disconnecting a customer's premises from a plurality of utilities. The device is ideally located within a utility meter, for example, a gas, water or electricity meter, thereby reducing the number of products that need to be installed at the customer premises. Generally, the device may be controlled remotely, thereby allowing for remote connection and disconnection of any of a plurality of utilities. However, the device may be configured to allow for automated local connection and disconnection of a plurality of utilities. Either remote or automated local control of the connection to a plurality of utilities may be employed to implement a prepayment system for a plurality of utilities.

A first embodiment of the invention is an apparatus for controlling the connection of a customer to a plurality of utilities, the apparatus including a utility meter housing, a measurement device, and a control circuit. The measurement device is supported by the housing and is operable to measure a consumed commodity. The control circuit is also supported by the housing and is configured to provide control signals to a plurality of connection devices. Each of the plurality of connection devices is operable to selectively connect and disconnect the customer to one of the plurality of utilities responsive to said control signals.

A second embodiment of the invention is an arrangement for controlling the connection of a customer to a plurality of utilities that includes a control circuit, a digital communication interface, and a plurality of connection devices. The control circuit is configured to generate control signals. The digital communication interface is operable to generate digital communication signals from the control signals. The plurality of connection devices, each operable to selectively connect and disconnect the customer to one of the plurality of utilities responsive to said digital communication signals.

The above described features and advantages, as well as others, will become readily apparent to those of ordinary skill in the art by reference to the following detailed description and accompanying drawings.

DETAILED DESCRIPTION

Figure 1:
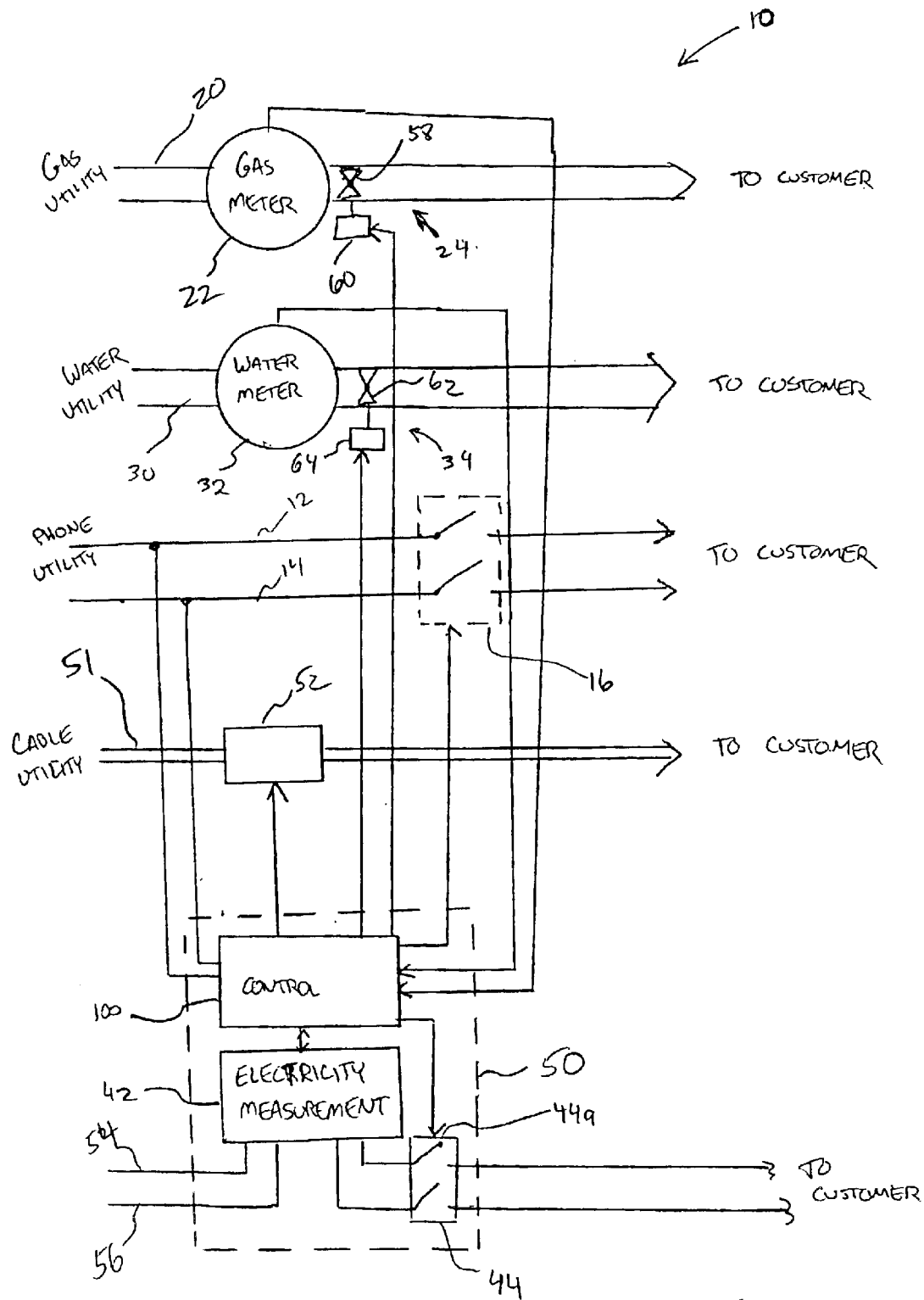
FIG. 1 shows a block diagram of an exemplary arrangement according to the invention that includes a multi-utility control circuit located within an electricity meter housing.

FIG. 1 shows an exemplary arrangement 10 according to the invention for controlling the connection of a customer to a plurality of utilities. The arrangement 10 includes an electricity meter circuit 42, a utility controller 100, and an electricity disconnect device 44, all preferably housed within an electricity meter housing 50. The arrangement 10 further includes a telephone disconnect switch 16, a gas utility disconnect device 24, a water utility disconnect device 34, and a cable utility disconnect device 52.

In general, the utility controller 100 is a circuit that is operable to cause a select utility device to alternately allow and inhibit delivery of utility service (i.e. connect and disconnect a utility) to a customer. The term "customer", as used herein, is meant to include the utility consumption systems on the premises of the customer, such as, for example, the electrical system of the customer, the gas supply line of the customer, the water supply line of the customer, the internal telephone wiring system of the customer, and the coaxial cable distribution system of the customer.

The utility controller 100 is further operable to communicate with a remote computer or device, not shown, to receive instructions regarding the connection or disconnection of a utility to or from the customer. Select connection or disconnection allows for prepaying arrangements whereby a customer prepays for a predetermined amount of a utility commodity. The utility service may be disconnected once the prepaid amount of the commodity has been consumed. Alternatively, select connection or disconnection may be used to maintain minimal or subsistence service levels for customers in arrears. Finally, remote control allows for disconnection of a utility without requiring a technician to enter onto the property occupied by the customer.

In the exemplary embodiment described herein, the utility controller 100 is operably connected to the remote computer via telephone lines 12, 14. To this end, the utility controller 100 may suitably include a modem. Alternatively, the utility controller 100 may be connected to the remote computer via another communication device or medium, such as the cable line via a cable modem, or the power lines via a power line carrier modem. Data communication over coaxial cable networks and over the power lines via power line carriers is known in the art.

The electricity meter circuit 42 is a circuit that is operably connected to the power lines to obtain energy measurements therefrom. Such devices are well known in the art. For example, the electricity meter circuit 42 may be electromechanical in nature, such as those that employ rotating disks which are well known in the art, or primarily electronic in nature, such as those shown in U.S. Pat. Nos. 5,544,089 and 6,112,158, both of which are incorporated herein by reference. In the exemplary embodiment described herein, the electricity meter circuit 42 is coupled directly to power lines 54 and 56 to obtain energy measurements therefrom. In other embodiments, the electricity meter circuit 42 may be connected to the power lines 54 and 56 indirectly, as through transformers.

The power lines 54 and 56 pass through the meter circuit 42 between the load, i.e. the customer, and the utility. Also coupled between the meter circuit 42 and the load on the power lines 54 and 56 is the electricity disconnect switch 44. The electricity disconnect switch 44 has a control input 44*a* operably coupled to the controller 100. The electricity disconnect switch 44 is operable to open the circuit along power lines 54 and 56 between the utility and customer responsive to control signals received at the input 44*a*.

The utility controller 100 is also operably coupled to connect and disconnect the gas utility to the customer. To this end, the gas line 20 includes a gas meter 22 and an associated gas disconnect device 24. The utility controller 100 is operable to cause the gas disconnect device 24 to inhibit the flow of gas from the utility to the customer. The utility controller 100 is further operable to cause the gas disconnect device 24 to reconnect the customer, i.e., to permit the flow of gas from the utility to the customer.

In one embodiment, the gas disconnect device 24 may suitably include a valve 58 and an actuator 60. The actuator 60 is responsive to control signals received from the controller 100 to correspondingly close or open the valve 58. When the valve 58 is closed, no gas (or a substantially reduced amount of gas) may flow to the customer. When the valve 58 is open, gas is provided to the customer.

As will be discussed further below, the control signal may simply be a binary signal, or power signal. Alternatively, the control signal may be in digital message format transmitted over a communication link, for example, an RS-232 link. In such a case, the actuator 60 would include a circuit operable to receive such signals. An example of such an actuator is shown in FIG. 3.

Figure 3:
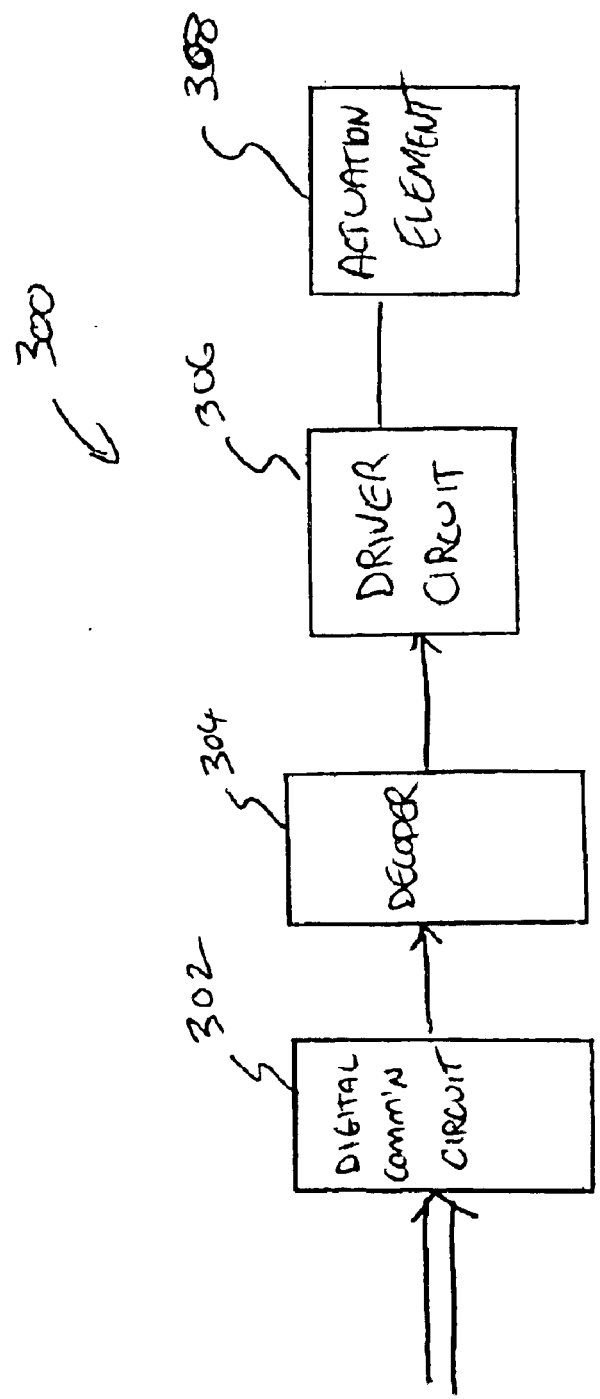
FIG. 3 shows a block diagram of an exemplary actuator circuit that may be used in the arrangement of FIG. 1.

Referring now to FIG. 3, an actuator 300 that may be used as one or more of the actuators 60 and 64 of FIG. 1 is shown. The actuator 300 is operable to receive digital communication signals, decode the signals, and provide a corresponding power signal that causes the actuator to open or close a connection between a utility and a customer. To this end, the actuator 300 includes a communication circuit 302, a decoder 304, a driver circuit 306, and an actuating element 308. The communication circuit 302 is a device operable to receive digital communication signals in the format employed by the controller, for example, serial data signals. The communication circuit 302 is operably coupled to provide data signals to the decoder 304. The decoder 304 is operable to extract from received data signals information representative of a "connect" or "disconnect" command. The communication circuit 302 and the decoder 304 may be incorporated into a single semiconductor substrate, or may share various elements.

In any event, the decoder 304 provides the decoded data "connect" or "disconnect" command to the driver circuit 306. The driver circuit 306 is a circuit that is operable to provide power signals to the actuation element 308 causes the actuation element 308 to open or close the mechanical element that connects or disconnects the customer from the utility. For example, the actuation element 308 may be a stepper motor or a solenoid that opens or closes a water valve or gas valve. The actuation element 308 may alternatively be a circuit breaker that connects or disconnects utility power lines, coaxial cable connections, or the telephone line. Power transistors may in some cases be employed as actuation elements. In any of the above cases, the driver circuit 306 is a device that converts the low power logic signal generated by the decoder 304 with the appropriate power signal to cause operation of the actuation element 308. Those of ordinary skill in the art may readily devise a suitable driver circuit for the corresponding actuation element.

Referring again to FIG. 1, the actuator 60 may therefore be a circuit such as the actuator 300 of FIG. 3. The use of digital communications and encoded signals that are decoded at the actuator 60 provides addition protection against tampering. Digital communication signals, particularly if encoded, are relatively difficult to replicate without sophisticated equipment. By contrast, if the controller 100 were configured to merely provide power control signals to the actuator 60, a customer could readily defeat the system by splicing the connection to the actuator 60 and providing suitable power signals.

It will be appreciated that the encoding of the digital signals need not be particularly elaborate, as intercepting serial data communication signals may inherently involve sufficient complexity to thwart common tampering. Accordingly, it may be sufficient for the actuator 306 of FIG. 3 to include the digital communication circuit 302 without a decoder circuit 304.

Referring again specifically to the connection and/or disconnection of gas services over the gas line 20, the utility controller 100 may suitably act upon commands received over the telephone lines 12, 14 to inhibit or permit gas flow. Alternatively, the utility controller 100 may receive information identifying certain parameters from which the utility controller 100 itself determines when to inhibit or permit gas flow. Such parameters may include information identifying a finite amount of gas that may be consumed, such as in a prepayment situation. For example, a customer may prepay for the use of a predetermined amount of gas. The utility controller 100 permits gas flow (via control of the gas disconnect device 24) only until prepaid amount of gas is consumed. In this and other arrangements, the utility controller 100 requires information relating to the consumption of gas. To this end, the utility controller 100 is preferably further operably connected to receive consumption information from the gas meter 22.

The utility controller 100 is similarly operably coupled to connect and disconnect the water utility to the customer. To this end, the water line 30 includes a water meter 32 and an associated water disconnect device 34. The utility controller 100 is operable to cause the water disconnect device 34 to selectively inhibit or permit the flow of water from the utility to the customer.

The water disconnect device 34 includes a valve 62 and an actuator 64. The valve 62 is disposed within the water line 32 and is operable to selectively and controllably inhibit the flow of water through the water line 32 from the water utility to the customer. The actuator 64 causes the valve 62 to open or close responsive to control signals received from the utility controller 100. By way of example, the actuator 64 may suitably have the architecture of the actuator 300 of FIG. 3.

As with the gas utility, the utility controller 100 may simply receive "inhibit" or "permit" water flow commands from a remote computer over the telephone lines 12 and 14. Alternatively, the utility controller 100 may receive from the remote computer information identifying certain parameters from which the utility controller 100 may determine when to inhibit or permit water flow. Such determinations may require water consumption information. To this end, the utility controller 100 is further operably connected to receive consumption information from the water meter 32.

The utility controller 100 is similarly operably coupled to connect and disconnect the telephone utility to the customer. To this end, the telephone lines 12 and 14 include a disconnect switch 16. The disconnect switch 16 is coupled between the customer and the point on the telephone lines 12, 14 at which the utility controller 100 is connected to the telephone lines 12, 14 to ensure that communication with the utility controller 100 may continue even if the telephone service to the customer is disconnected. The disconnect switch 16 may suitably be directly connected to receive and "connect" or "disconnect" control signal from the controller 100, or may include a digital communication circuit and decoder operable to receive encoded digital signals that include "connect" or "disconnect" commands. For example, the disconnect switch 16 may include the digital communication circuit 302 and decoder 304 of the actuation of FIG. 3, discussed further above.

The utility controller 100 is similarly operably coupled to connect and disconnect the cable utility to the customer. The cable utility, as discussed herein, is a broadband one-way or two-way communication link between the customer and a head end service provider. For example, the cable utility may be a cable television network that employs coaxial cable and/or optical fiber links, and provides broadband analog television, digital television, Internet access, and music programming to the customer. The cable utility provides such services to the customer over the cable communication link 51. Cable communication links are well known, and may suitable include coaxial cable To provide for controllable connection and disconnection, the cable communication link 51 includes an RF switch 52. The RF switch 52 is coupled between the customer and cable utility head end. The RF switch 52 may suitably be directly connected to receive and "connect" or "disconnect" control signal from the controller 100, or may include a digital communication circuit and decoder operable to receive encoded digital signals which contain "connect" or "disconnect" commands. For example, the RF switch 52 may include the digital communication circuit 302 and decoder 304 of the actuation of FIG. 3, discussed further above.

As with the gas utility, the utility controller 100 may receive simple "connect" or "disconnect" commands for the cable communication link 51 and act accordingly. Alternatively, the utility controller 100 may receive information identifying certain parameters and/or rules from which the utility controller 100 may determine when to inhibit or permit the access to the broadband signals or bandwidth of the cable utility.

It is noted that the disconnect devices 24 and 34 may in some cases be housed within the same housing as the associated meter. Such location further inhibits tampering, as meter housings typically inherently include tamper-inhibiting arrangements.

The above-described arrangement 10 thus allows for control over the connection of various utilities, including any combination of gas, electric, water, telephone, and broadband signal services, to a particular customer. The customer may be a residence, commercial or farm establishment. The customer may also be a rental residence or rental space where utilities may be purchased for temporary use on the spot. In such a case, payment may be received by a credit card reader or the like, not shown in FIG. 1, supported by the meter housing 50. The payment may be processed locally at the utility controller 100 to allow for the limited use of the specified utility, or the payment (and the request for service) may be communicated by the utility controller 100 to a remote computer. The remote computer could then provide the connection commands to the utility controller 100, which would in turn control connection to the appropriate utility or utilities.

Figure 2:
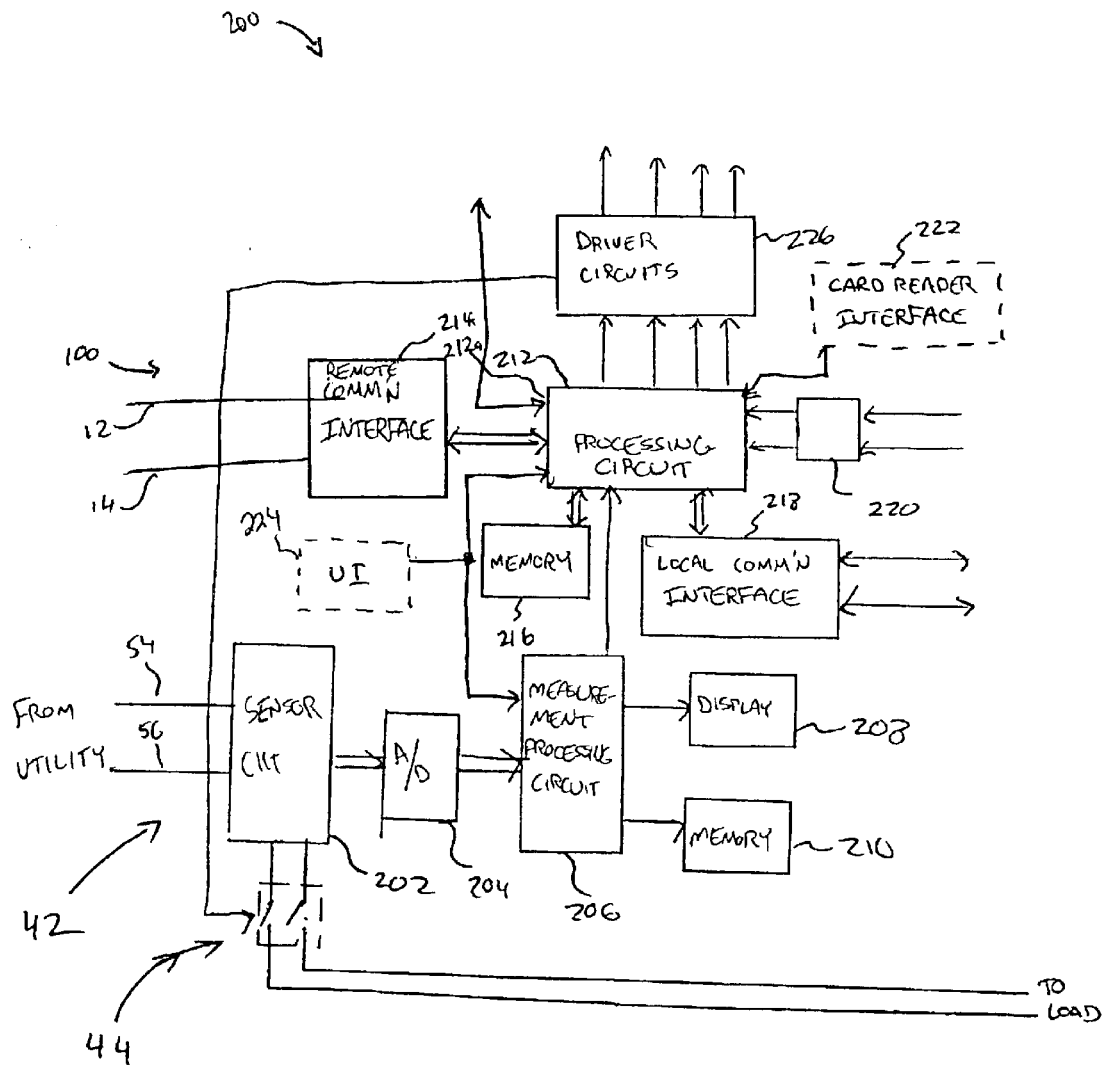
FIG. 2 shows in further detail a block diagram of a combined utility control circuit and electricity meter circuit that may be used in the arrangement of FIG. 1.

FIG. 2 shows in further detail an exemplary embodiment of a combined measurement device and utility controller 200 according to the present invention. The combined measurement device and utility controller 200 includes exemplary embodiments of the electricity meter circuit 42, the utility controller 100, and the electricity disconnect switch 44 of FIG. 1. In general, the elements of combined measurement device and utility controller 200 are preferably supported within the utility meter housing 50. The meter housing 50 may be of relatively conventional utility meter housing design. Such designs typically include, among other things, inherent tamper protection.

The exemplary embodiment of the electricity meter circuit 42 of FIG. 2 includes a sensor circuit 202, an analog to digital ("A/D") circuit 204, a measurement processing circuit 206, a display 208 and a memory 210. The electricity meter circuit 42 of FIG. 2 is an electronic meter of the general type shown in U.S. Pat. Nos. 5,544,089 and 6,112,158.

In particular, the sensor circuit 202 is operably connected to obtain analog energy measurement signals from the power lines 54 and 56. To this end, the sensor circuit 202 may suitably include one or more current sensors and voltage sensors. The A/D converter 204 is operably coupled to receive the analog energy measurement signals and is further operable to generate digital measurement signals therefrom. The A/D converter 204 is operably coupled to provide the digital energy measurement signals to the measurement processing circuit 206.

The measurement processing circuit 206 is a device that is configured to receive digital measurement signals and is operable to generate metering information therefrom. The metering information may include information identifying an accumulated quantity of consumed real energy, reactive energy, apparent energy, and/or other energy related quantities. The measurement processing circuit 206 often includes a digital signal processor, and may further employ a microprocessor or microcontroller.

The measurement processing circuit 206 is further operably coupled to provide at least some of the metering information to the display circuit 208 and the memory 210. The display circuit 208 may then provide a visual display of the metering information. The memory 210, which includes a non-volatile memory, stores the metering information and retains the information in the event of a power interruption.

The measurement processing circuit 206 is further operable to provide at least some metering information to the utility controller 100, and more particularly, to the controller processing circuit 212.

Referring now to the utility controller 100, the exemplary utility controller 100 of FIG. 2 includes many features, some of which may not be necessary for every implementation of the present invention. However, each feature provides functionality that is useful in certain circumstances.

The utility controller 100 of FIG. 2 includes a controller processing circuit 212, a remote communication interface 214, a memory 216, a local communication interface 218, an A/D converter 220, an optional card reader 222, an optional user interface ("UI") 224, and driver circuits 226.

The controller processing circuit 212 is operable to generate control signals and operably connected to provide control signals (in some format) to the plurality of disconnect devices 16, 24, 34, 44 and 52 shown in FIG. 1. The control signals provided to the disconnect devices are at least operable to cause the devices to connect or disconnect select corresponding utility services from a customer.

The remote communication interface 214 is operably connected to the controller processing circuit 212 as well as a communication medium, for example, the telephone lines 12 and 14. The remote communicate interface 214 is a circuit that allows for the communication of digital data between a remote computing device, not shown, and the controller processing circuit 212. To this end, the remote communication interface 214 may suitably be a telephone modem. However, the remote communication interface 214 may alternatively be a cable modem that permits communication over the cable link 51 or a power line carrier modem that permits communication over the power lines 54 and 56. In yet another embodiment, the remote communication interface 214 may be a radio modem that is operable to communicate with a remote wireless radio that is operably coupled to the remote computing device.

The memory 216 is operable to store various information and instructions associated with the operation of controller processing circuit 212. For example, the memory 216 may store measurement information received from the various meters 22, 32. The memory 216 may also store consumption information corresponding to prepurchased commodities. That consumption information may include information indicative of, for example, gas or water volume, electrical energy, bandwidth usage, or connection time.

The local communication interface 218 is operably connected between the controller processing circuit 212 and one or more of the connection devices 16, 24, 34, 44, and 52. The local communication interface 218 is operable to generate digital communication signals for local transmission, for example, using RS-232 communication protocol, that are compatible with digital communication devices at one or more of the connection devices 16, 24, 34, 44 and 52. Moreover, the local communication interface 218 may further be operable to receive digital communication signals representative of commodity consumption information from the meters 22, 32 (or other devices) to the extent such devices are capable of generating such digital communication signals. Typically, however, gas meters, water meters and the like do not contain RS-232 communication circuitry or similar digital communication circuitry, and thus cannot communicate consumption information to the controller processing circuit 212 via the local communication interface 218.

Instead, water and/or gas meters capable of generating any electrical output typically generate a pulse-type output. Each pulse is indicative of the usage of a finite quantity of a consumable commodity. For example, the gas meter 22 may suitably generate a pulse every time a finite volume of gas has been consumed. To obtain these readings, the analog input circuit 220 of the controller 100 is operably coupled to receive the pulses, and generate logic level signals therefrom. The analog input circuit 220 provides those logic level pulses to the controller processing circuit 212, which is then capable of tracking overall consumption of the corresponding commodity.

The optional card reader interface 222 is a device that is capable of obtaining information from a magnetic stripe card, smart card, or other portable data storage. The optional card reader 222 is operable to obtain information regard quantities of prepurchased commodities. The optional UI 224 may include a keypad or the like that allows the user to provide input to the controller processing circuit 212, as needed. By way of example, the UI 224 may be used to obtain verification of requests for service otherwise input through the optional card reader 222.

The driver circuits 226 include one or more circuits operable to provide power control signals to one or more of the connection devices 16, 24, 34, 44 and 52. In particular, the driver circuits 226 are configured to obtain digital control signals from the controller processing circuit 212 and provide corresponding power control signals to any of the connection devices 16, 24, 34, 44 or 52 that do not include digital communication capabilities such as those of the actuator 300 of FIG. 3. In particular, while it is advantageous to control the operation of the connection devices 16, 24, 34, 44 and 52 using encoded digital communication signals, some connection devices may not have that capability. In such a case, the driver circuit 226 may be used to provide the control signals directly to the connection device.

Moreover, operation of the electricity disconnect switch 44 in the embodiment described herein does not employ encoded digital communications. As discussed above, encoded digital communication control signals are employed to help reduce the possibility of customer override of a disconnect signal. However, because the electricity disconnect switch 44 is located within the meter housing 50, which presumably contains its own tamper protection, the use of encoded digital communication signals is not necessary.

In the operation of the controller 100, the controller processing circuit 212 may, from time to time, determine that a particular utility should be disconnected from the customer. Such a determination may result from the reception of signals from a remote control device, such as a remote computer controlled by the utility, not shown. The remote computer may generate a disconnect signal in order to disconnect a non-paying customer, or upon the exhaustion of prepaid services.

Alternatively, in the case of prepaid services, the controller processing circuit 212 may locally make the disconnection determination based on the amount of the commodity that was prepurchased, as well as consumption information regarding that commodity. If the controller processing circuit 212 determines from the consumption information that the prepurchased quantity of the commodity has been consumed, then the controller processing circuit 212 will determine that the corresponding utility should be disconnected.

In further detail, as discussed above, the controller processing circuit 212 is preferably coupled to the meters to receive consumption information regarding the utility commodities. For example, consumption information for gas may be received from the gas meter 22 via the local communication interface 218 or the analog communication interface 220. Consumption information from the water meter 32 and electricity meter circuit 42 may be received in either manner as well. The consumption information from the electricity meter circuit 42 may further be provided directly from the measurement processing circuit 206. In any event, the controller processing circuit 212 employs the received commodity consumption information relating to the prepaid commodity and determines when the prepaid amount of the commodity has been consumed.

Upon determination that a utility is to be disconnected from a consumer, the controller processing circuit 212 generates a corresponding "disconnect" control signal and provide the control signal to the corresponding disconnect device using either the local communication interface 218 or the driver circuits 226.

The controller processing circuit 212 may also, from time to time, determine that a particular utility should be connected from the customer. In other words, the controller processing circuit 212 may make a determination that a particular utility service should be restored. Such a determination may result from the reception of signals from a remote control device, such as a remote computer controlled by the utility, not shown.

Connection of service determinations may also be made responsive to information received from the card reader 222, the UI 224, or a combination of both that a particular prepaid purchase of a utility commodity has been made. In any event, if the prepaid commodity information is provided locally, via the card reader 222 or the UI 224 (or a combination of both), the controller processing circuit 212 may further communicate with remote computers via the remote communication interface 214 to verify and/or log the purchase of prepaid commodities. Once a valid prepaid purchase of a quantity of a utility commodity is communicated to the controller processing circuit 212, the controller processing circuit 212 will determine that the corresponding utility should be connected to the customer, if it is not already connected.

Upon the determination that a utility is to be connected to a consumer, the controller processing circuit 212 generates a corresponding "connect" control signal and provides the control signal to the corresponding disconnect device using either the local communication interface 218 or the driver circuits 226.

It will be appreciated that the circuit described above allows for both remote control of the connection of a plurality of utilities as well as automated local control of the connection of a plurality of utilities from a single control device at the customer premises. Ideally, the control device is located within an existing meter housing to eliminate the need for yet another separate tamper proof housing. It will be appreciated that the remote control of a plurality of utility connections may be used in many ways not specifically described herein, but which benefit from the arrangement described above.

Moreover, it will be appreciated that the above described embodiments are merely exemplary, and that those of ordinary skill in the art may readily devise their own implementations and modifications that incorporate one or more of the principles of the present invention and fall within the spirit and scope thereof.

I claim:

1. An apparatus for controlling the connection of a customer to a plurality of utilities, comprising:
    a utility meter housing;
    a measurement device supported by the housing, the measurement device operable to measure a consumed commodity, and
    a control circuit supported by the housing and configured to provide control signals to a plurality of connection devices, each of the plurality of connection devices operable to selectively connect and disconnect the customer to one of the plurality of utilities responsive to said control signals.

2. The apparatus of claim 1, further comprising a communication circuit supported by the housing, the communication circuit operably coupled to the control circuit, the communication circuit operable to effect communications between the control circuit and a remote processor.

3. The apparatus of claim 2, wherein the control circuit is further operable to generate the control signals based at least in part on information received from the remote processor via the communication circuit.

4. The apparatus of claim 2 wherein the communication circuit comprises a telephone modem.

5. The apparatus of claim 2 wherein the communication circuit comprises a power line carrier modem.

6. The apparatus of claim 2 wherein the communication circuit comprises a cable modem.

7. The apparatus of claim 2 wherein the communication circuit comprises a radio modem.

8. The apparatus of claim 1, wherein the control circuit is further configured to provide control signals to the plurality of connection devices, a first of the plurality of connection devices operable to selectively connect and disconnect the customer to a water utility and a second of the plurality of connection devices operable to selectively connect and disconnect the customer to an electrical utility.

9. The apparatus of claim 8, wherein the control circuit is further configured to provide control signals to the plurality of connection devices, a third of the plurality of connection devices operable to selectively connect and disconnect the customer to a telephone utility.

10. The apparatus of claim 1, wherein the control circuit is further configured to provide control signals to the plurality of connection devices, a first of the plurality of connection devices operable to selectively connect and disconnect the customer to a telephone utility.

11. The apparatus of claim 1, wherein the control circuit is further configured to provide control signals to the plurality of connection devices, a first of the plurality of connection devices operable to selectively connect and disconnect the customer to a cable utility.

12. The apparatus of claim 1, wherein the control circuit further comprises a second communication circuit operably coupled to at least one of the plurality of connection devices, the second communication circuit operable to generate the control signals as digital communication signals.

13. The apparatus of claim 1, wherein the control circuit further comprises a control processing circuit operable to generate digital control signals;

a driver circuit coupled between the control processing circuit and at least one of the plurality of connection devices, the driver circuit operable to receive the digital control signals and generate at least some of the control signals therefrom.

14. The apparatus of claim 1, wherein the measurement circuit is operable to measured consumed electrical energy.

15. The apparatus of claim 14, wherein the measurement circuit includes a sensor circuit adapted to be operably coupled to electrical utility lines, a measurement processing circuit, and an analog to digital converter coupled between the sensor circuit and the measurement processing circuit.

16. An arrangement for controlling the connection of a customer to a plurality of utilities, comprising a control circuit configured to generate control signals;

a digital communication interface operable to generate digital communication signals from the control signals, and a plurality of connection devices, each of the plurality of connection devices operable to selectively connect and disconnect the customer to one of the plurality of utilities responsive to said digital communication signals.

17. The arrangement of claim 16, further comprising at least one additional connection device, and wherein the control circuit further comprises a driver circuit operable to provide control signals to the additional connection device.

18. The arrangement of claim 16, wherein a first of the plurality of connection devices is operable to selectively connect and disconnect the customer to a water utility and a second of the plurality of connection devices operable to selectively connect and disconnect the customer to an electrical utility.

19. The arrangement of claim 18, wherein a third of the plurality of connection devices is operable to selectively connect and disconnect the customer to a telephone utility.

20. The arrangement of claim 16, wherein a first of the plurality of connection devices is operable to selectively connect and disconnect the customer to a telephone utility.

21. The arrangement of claim 16, a first of the plurality of connection devices is operable to selectively connect and disconnect the customer to a cable utility.

* * * * *